United States Patent
Muhonen et al.

(10) Patent No.: US 7,440,559 B2
(45) Date of Patent: Oct. 21, 2008

(54) SYSTEM AND ASSOCIATED TERMINAL, METHOD AND COMPUTER PROGRAM PRODUCT FOR CONTROLLING THE FLOW OF CONTENT

(75) Inventors: Ahti Muhonen, Hirvihaara (FI); Antti-Pentti Vainio, Espoo (FI); Ari Hännikäinen, Turku (FI)

(73) Assignee: Nokia Corporation, Espoo (FI)

( * ) Notice: Subject to any disclaimer, the term of this patent is extended or adjusted under 35 U.S.C. 154(b) by 820 days.

(21) Appl. No.: 10/690,692

(22) Filed: Oct. 22, 2003

(65) Prior Publication Data

US 2005/0089022 A1     Apr. 28, 2005

(51) Int. Cl.
*H04M 3/42* (2006.01)

(52) U.S. Cl. ............. 379/201.01; 379/265.09; 379/221.08; 379/221.09; 379/221.11; 379/221.12; 370/352

(58) Field of Classification Search ............ 370/352; 379/265.09, 221.08, 221.09, 221.11, 221.12, 379/201.01
See application file for complete search history.

(56) References Cited

U.S. PATENT DOCUMENTS

| 5,450,482 | A | * | 9/1995 | Chen et al. .......... 379/230 |
| 5,884,032 | A | * | 3/1999 | Bateman et al. ........ 709/204 |
| 5,974,454 | A | | 10/1999 | Apfel et al. |
| 5,978,806 | A | * | 11/1999 | Lund .................. 707/10 |
| 6,029,175 | A | | 2/2000 | Chow et al. |
| 2002/0021809 | A1 | | 2/2002 | Salo et al. |
| 2002/0023264 | A1 | | 2/2002 | Aaltonen et al. |
| 2002/0062336 | A1 | | 5/2002 | Toedosiu et al. |
| 2002/0069406 | A1 | | 6/2002 | Aaltonen et al. |
| 2002/0087997 | A1 | | 7/2002 | Dahlstrom |
| 2003/0084177 | A1 | | 5/2003 | Mulligan |
| 2003/0104801 | A1 | | 6/2003 | Koulakiotis |
| 2003/0134653 | A1 | | 7/2003 | Sarkkinen et al. |
| 2003/0174645 | A1 | | 9/2003 | Paratainen et al. |
| 2004/0213207 | A1 | * | 10/2004 | Silver et al. ........... 370/352 |
| 2005/0086318 | A1 | * | 4/2005 | Aubault ............... 709/213 |

FOREIGN PATENT DOCUMENTS

| EP | 1130 459 A2 | 9/2001 |
| WO | WO 01/45319 A1 | 6/2001 |
| WO | WO 03/001755 A1 | 1/2003 |

OTHER PUBLICATIONS $3^{rd}$ *Generation Partnership Project; Technical Specification Group Services and System Aspects; Multimedia Broadcast/Multicast Service; Stage 1 (Release 6);* 3 GPP TS 22.146; Mar. 2003; 17 pages; V6.2.0; $3^{rd}$ Generation Partnership Project (3GPP™).

* cited by examiner

*Primary Examiner*—Quynh H Nguyen
(74) *Attorney, Agent, or Firm*—Alston & Bird LLP

(57) ABSTRACT

A system for controlling a flow of content includes a terminal and a network entity. The terminal is capable of sending a content status including terminal status information having a listing of one or more pieces of content stored in a memory of the terminal. The network entity includes a content flow manager that is capable of receiving the terminal status information. Then, based upon the terminal status information, the content flow manager can control the flow of content to the terminal. More particuarly, for example, the content flow manager can be capable of controlling the terminal to delete at least one piece of content from a memory of the terminal, and/or download at least one piece of content from a source of content.

24 Claims, 5 Drawing Sheets

SYSTEM AND ASSOCIATED TERMINAL, METHOD AND COMPUTER PROGRAM PRODUCT FOR CONTROLLING THE FLOW OF CONTENT

FIELD OF THE INVENTION

The present invention generally relates to systems and methods for controlling the flow of content and, more particularly, to systems and associated terminals, methods and computer program products for controlling the flow of content in terminals operable with mobile telecommunication and digital broadcast networks.

BACKGROUND OF THE INVENTION

The deployment of advanced high bit-rate mobile networks has opened up new opportunities for delivering a host of services in a way that was not possible with earlier second generation wireless networks. Recent systems including third generation (3G) systems, such as those specified for use with the Global System for Mobile Communications (GSM) wireless standard, enable the delivery of new digital services such as video calls and the playback of multimedia applications that are comprised of audio and video clips. Although the increased bit rates of 3G systems widen the possibilities for providing digital services.

The increased bit rates of 3G systems provide adequate performance for delivering high quality digital audio and acceptable quality moving image clips. However, at these transfer rates it may be difficult to handle exceedingly high data intensive tasks such as delivering high quality full-motion video and transferring very large data files to mobile terminals. In this regard, attempts at downloading large data files may lead to inconveniently long downloading times that can be undesirably costly for users. For this and other reasons, alternative broadband delivery techniques have been investigated that could provide a practical solution for high data intensive tasks in terms of lower cost and convenience for the users involved.

One such delivery technique that has shown promise is Digital Video Broadcasting (DVB). In this regard, DVB-T, which is related to DVB-H (handheld), DVB-C (cable) and DVB-S (satellite), is the terrestrial variant of the DVB standard. As is well known, DVB-T is a wireless point-to-multi-point data delivery mechanism developed for digital TV broadcasting, and is based on the MPEG-2 transport stream for the transmission of video and synchronized audio. DVB-T has the capability of efficiently transmitting large amounts of data over a broadcast channel to a high number of users at a lower cost, when compared to data transmission through mobile telecommunication networks using, e.g., 3G systems. Advantageously, DVB-T has also proven to be exceptionally robust in that it provides increased performance in geographic conditions that would normally affect other types of transmissions, such as the rapid changes of reception conditions, and hilly and mountainous terrain.

Digital broadband data broadcast networks are known. As mentioned, an example of such a network enjoying popularity in Europe and elsewhere world-wide is DVB which, in addition to the delivery of television content, is capable of delivering data, such as Internet Protocol (IP) data. Other examples of broadband data broadcast networks include Japanese Terrestrial Integrated Service Digital Broadcasting (ISDB-T), Digital Audio Broadcasting (DAB), and MBMS, and those networks provided by the Advanced Television Systems Committee (ATSC). In many such networks, a containerization technique is utilized in which content for transmission is placed into MPEG-2 packets which act as data containers. Thus, the containers can be utilized to transport any suitably digitized data including, but not limited to High Definition TV, multiple channel Standard definition TV (PAUNTSC or SECAM) and, of course, broadband multimedia data and interactive services.

The combined use of mobile telecommunications with a broadband delivery technique such as DVB-T has been proposed in the past in order to achieve efficient delivery of digital services to users on the move. This would take advantage of existing infrastructures in the effort to provide personal communications (already prevalent) and the growing demand for Internet access, together with the expected rise of digital broadcasting, so that users can receive these services with a single device. Furthermore, DVB-T is a cross platform standard that is shared by many countries thereby making frequency compatibility and roaming less of an issue. The combination of mobile telecommunication and relatively very low cost digital broadband delivery techniques provides the possibility of interactive services such as uni-directional and bi-directional services such as audio and video streaming (e.g., TV, radio, etc.), file downloads and advanced gaming applications, etc.

In mobile terminals for combined use of mobile telecommunications and digital broadband data broadcast techniques, mobile terminals typically download content in accordance with a "pull" technique. In this regard, mobile terminals typically pull content from a server, such as by dispatching a uniform resource indicator (URI) from a mobile terminal to a server, which responds by providing information associated with the URI. Although mobile terminals typically download content in accordance with a pull technique, the server or content provider must typically have control over the content flow policy to the mobile terminal. For example, the server or content provider must typically have control over when pieces of content expire and are removed from the mobile terminal, when to deliver new pieces of content to the mobile terminal, what new pieces of content to deliver, etc.

As will be appreciated, in various instances, user preferences, capabilities of the mobile terminal and/or previous contents stored or otherwise received by the mobile terminal can have an affect on the flow of new content to the mobile terminal. Current techniques for downloading content from mobile terminals, however, do not provide for such user preferences, capabilities, previous contents and/or use of previous contents. Thus, current techniques for downloading content can suffer from inefficient content flow control between the mobile terminal and the server or content provider. More particularly, current techniques for downloading content can suffer from inefficient control of content received and thereafter stored by mobile terminals, as well as inefficient control of content stored by mobile terminals.

SUMMARY OF THE INVENTION

In light of the foregoing background, embodiments of the present invention provide an improved system and associated terminal, method and computer program product for controlling the flow of content, particularly to mobile terminals that are operable with mobile telecommunication and digital broadcast networks. To facilitate control of the flow of content in accordance with embodiments of the present invention, a terminal is capable of sending a content request that includes terminal status information. A network entity, such as a digital broadcast receiver, can then control the flow of content to the terminal based upon the terminal status information. Advantageously, the terminal status information can include information regarding the terminal that accounts for user preferences, capabilities of the terminal and/or previous contents stored by the terminal. Thus, in contrast to conventional techniques for downloading content to a terminal, the network entity can control the flow of content to the terminal based upon information that accounts for user preferences, capabilities of the terminal and/or previous contents stored by the terminal.

According to one aspect of the present invention, a system is provided for controlling a flow of content. The system includes a terminal and a network entity. The terminal is capable of sending a content status including terminal status information having a listing of one or more pieces of content stored in a memory of the terminal. The network entity (e.g., content flow server, origin server, digital broadcast receiver, etc.) includes a content flow manager that is capable of receiving the terminal status information. Then, based upon the terminal status information, the content flow manager can control the flow of content to the terminal. More particuarly, for example, the content flow manager can be capable of controlling the terminal to delete at least one piece of content from a memory of the terminal, and/or download at least one piece of content from a source of content (e.g., an origin server, digital broadcast receiver, etc.).

With the listing of one or more pieces of content stored in the memory of the terminal in the terminal status information, the control flow manager can be capable of instructing the terminal to delete one or more pieces of content from the memory of the terminal based upon the listing of the piece(s) of content stored in the memory of the terminal. Similarly, the control flow manager can be capable of controlling the terminal to download one or more pieces of content from the source of content based upon server status information including a listing of available piece(s) of content from the source.

More particularly, the control flow manager can be capable of determining if the memory of the terminal includes at least one piece of content to delete. Then, when the control flow manager determines that the memory of the terminal includes piece(s) of content to delete, the control flow manager can be capable of sending a response to the terminal instructing the terminal to delete at least one piece of content. Additionally, or alternatively, the control flow manager can be capable of determining if the source of content includes at least one available piece of content for the terminal to download. In such instances, the control flow manager can be capable of sending a response to the terminal instructing the terminal to download at least one available piece of content when the control flow manager determines that the source includes available piece(s) of content for the terminal to download.

According to other aspects of the present invention, a terminal, method and computer program product are provided for controlling the flow of content. Therefore, embodiments of the present invention provide a system and associated terminal, method and computer program-product for controlling the flow of content. The system and associated terminal, method and computer program product of embodiments of the present invention are capable of controlling the flow of content based upon terminal status information from the terminal, where the terminal status information includes information regarding the terminal. Advantageously, the terminal status information can include information reflecting user preferences, capabilities of the terminal, previous contents stored by the terminal, and/or the use of such previous contents. Therefore, the system, and associated terminal, method and computer program product of embodiments of the present invention solve the problems identified by prior techniques and provide additional advantages.

BRIEF DESCRIPTION OF THE DRAWINGS

Figure 1:
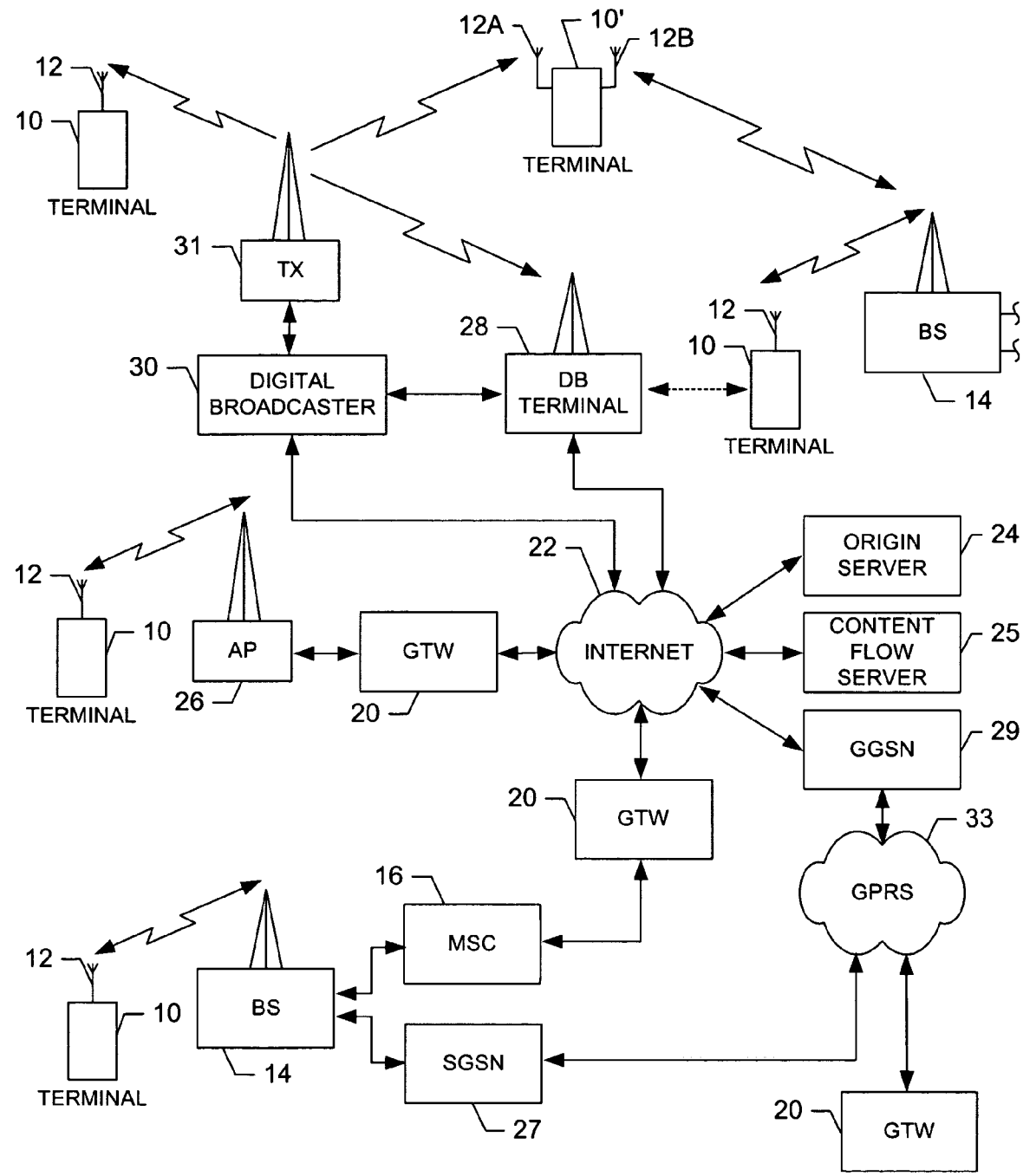
Figure 2:
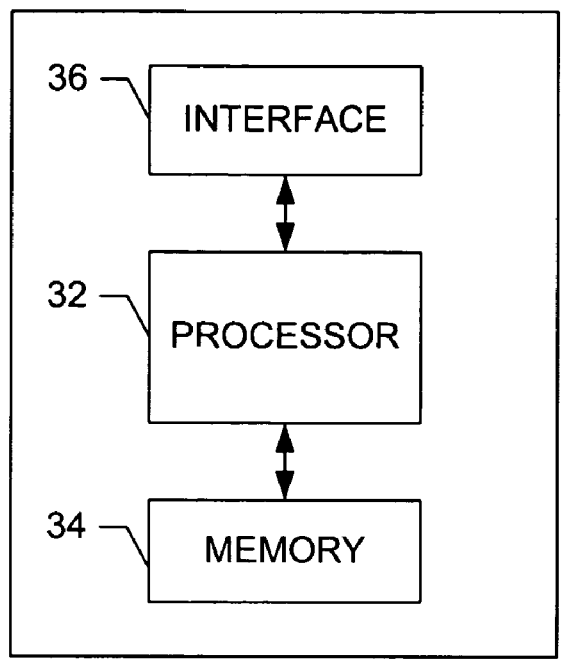
Figure 4:
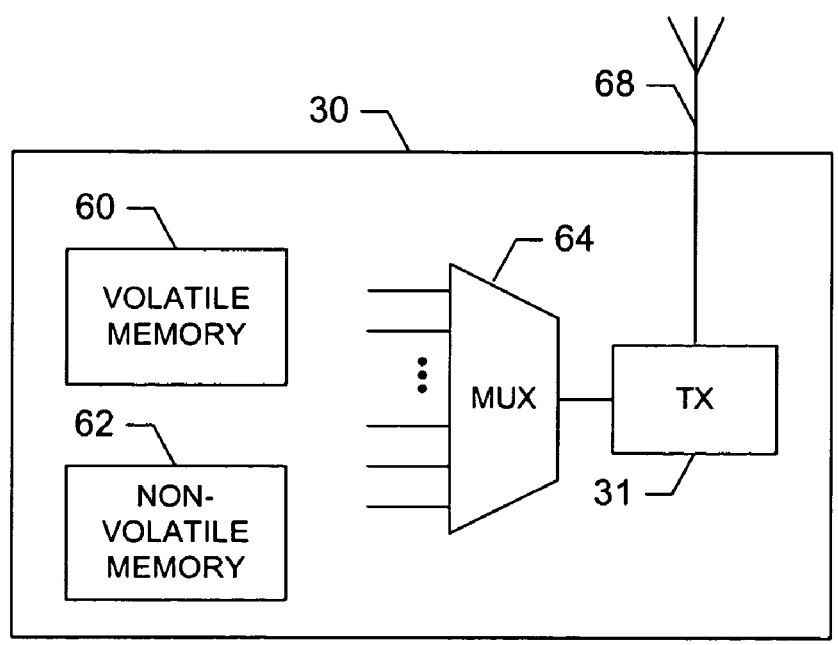
Figure 3:
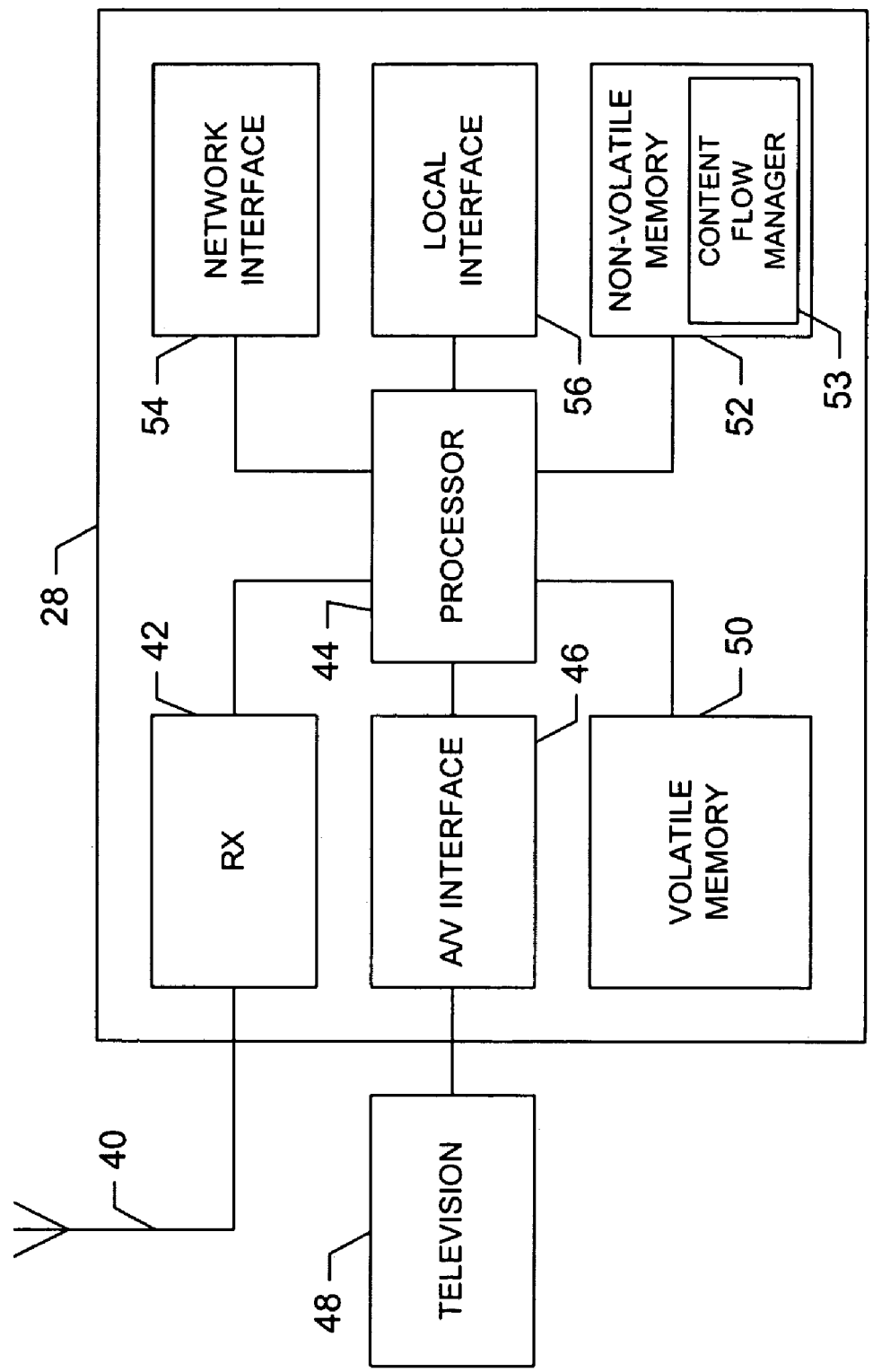
Figure 5:
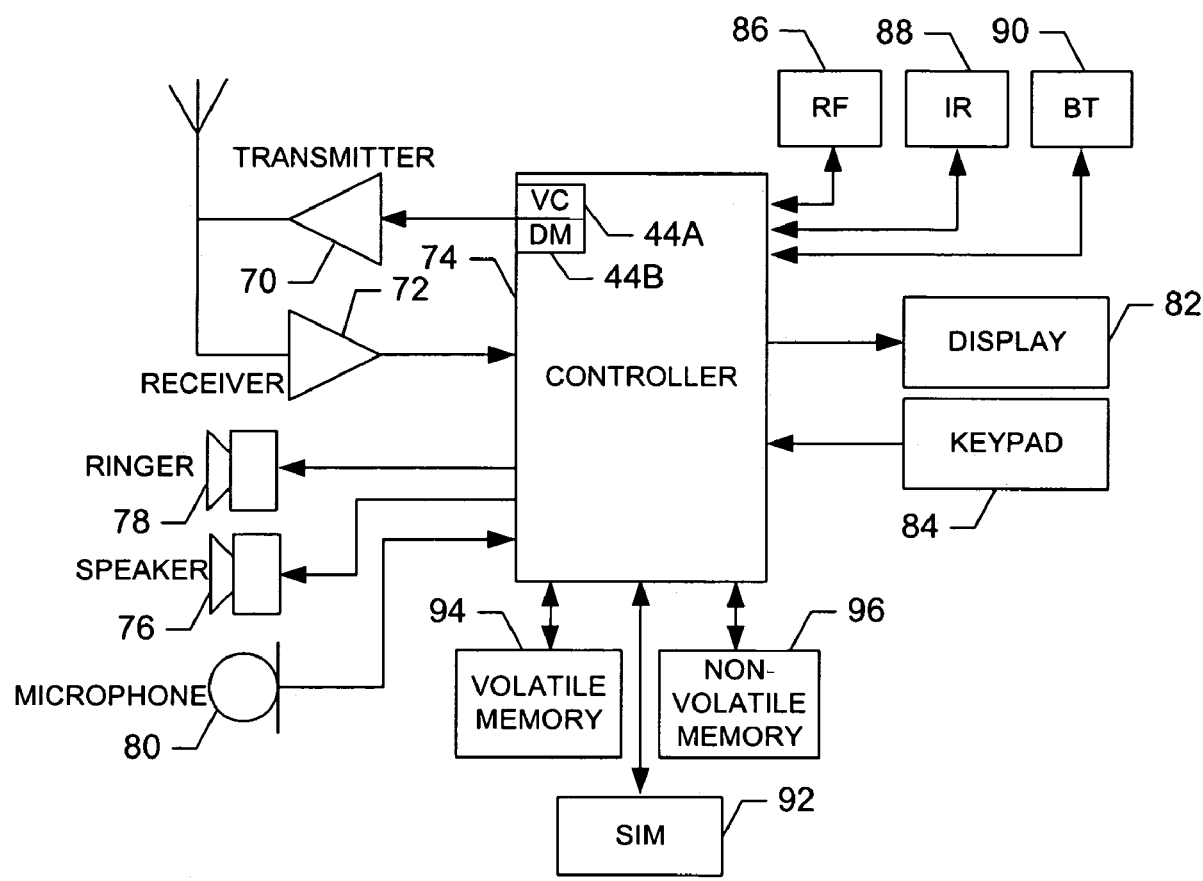
Figure 6:
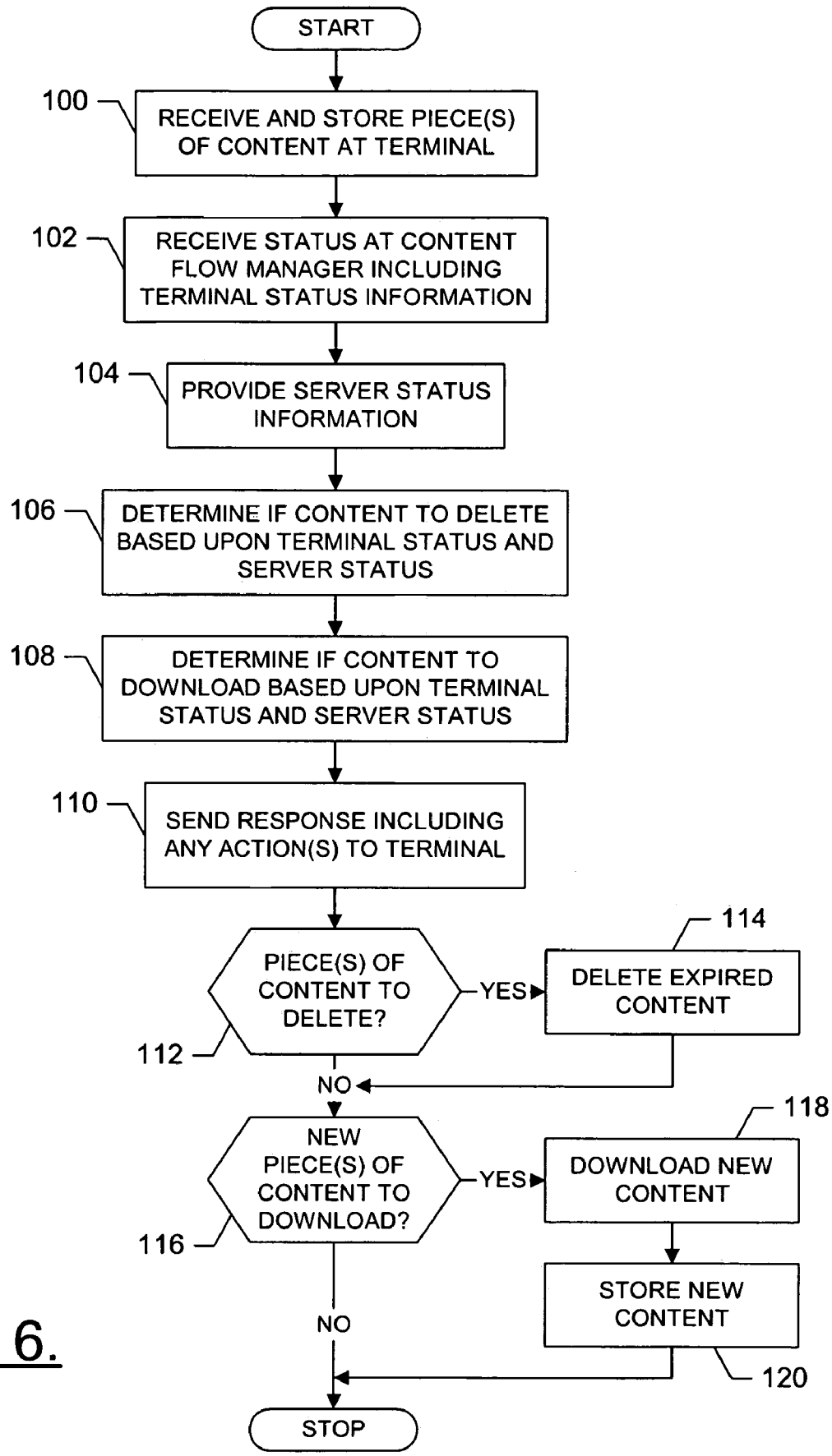

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which a terminal is bi-directionally coupled through wireless RF links;

FIG. 2 is a schematic block diagram of an entity capable of operating as a terminal, origin server, digital broadcast receiver and/or a digital broadcaster, in accordance with embodiments of the present invention;

FIG. 3 is a functional block diagram of a digital broadcast receiver, in accordance with one embodiment of the present invention;

FIG. 4 is a functional block diagram of the digital broadcaster, in accordance with one embodiment of the present invention;

FIG. 5 is a schematic block diagram of a mobile station that may operate as a terminal, according to embodiments of the present invention; and FIG. 6 is a flowchart of a method of controlling the flow of content in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 20.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 20, and the GTW is coupled to a WAN, such as the Internet 22. In turn, devices such as processing elements (e.g., personal computers, server computers or the like) can be coupled to the terminal 10 via the Internet. For example, the processing elements can include one or more processing elements associated with an origin server 24, one of which is illustrated in FIG. 1. As explained below, the processing elements can additionally or alternatively include a content flow server 25 capable of operating a content flow manager to control the flow of content to the terminal.

In addition to the MSC 16, the BS 14 can be coupled to a signaling GPRS (General Packet Radio Service) support node (SGSN) 27. As known to those skilled in the art, the SGSN is typically capable of performing functions similar to the MSC 16 for packet switched services. The SGSN, like the MSC, can be coupled to a data network, such as the Internet 22. The SGSN can be directly coupled to the data network. In a more typical embodiment, however, the SGSN is coupled to a packet-switched core network, such as a GPRS core network 33. The packet-switched core network is then coupled to another GTW, such as a GTW GPRS support node (GGSN) 29, and the GGSN is coupled to the Internet. In addition to the GGSN, the packet-switched core network can also be coupled to a GTW 20.

By coupling the SGSN 27 to the GPRS core network 33 and the GGSN 29, devices such as origin servers 24 and/or the content flow server 25 can be coupled to the terminal 10 via the Internet 22, SGSN and GGSN. In this regard, devices such as origin servers can communicate with the terminal across the SGSN, GPRS and GGSN. For example, origin servers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia Broadcast Multicast Service (MBMS)*, the contents of which are hereby incorporated by reference in its entirety.

In addition to being coupled to the BS 14, the terminal 10 one or more wireless access points (APs) 26. The APs can comprise access points configured to communicate in accordance techniques such as, for example, radio frequency (RF), Bluetooth (BT), infrared (IrDA) or any of a number of different wireless networking techniques, including WLAN techniques. The APs may be coupled to the Internet 22. Like with the MSC 16, the APs can be directly coupled to the Internet. In one advantageous embodiment, however, the APs are indirectly coupled to the Internet via a GTW 20. As will be appreciated, by directly or indirectly connecting the terminals and the origin server 24, as well as any of a number of other devices, to the Internet, the terminals can communicate with one another, the origin server, etc., to thereby carry out various functions of the terminal, such as to transmit data, content or the like to, and/or receive content, data or the like from, the origin server. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

Further, the terminal 10 can additionally, or alternatively, be coupled to a digital broadcaster 30 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 31, such as a DVB-T TX. Similarly, the terminal can include a receiver, such as a DVB-T receiver (not shown). The terminal can be capable of receiving content from any of a number of different entities in any one or more of a different number of manners. In one embodiment, for example, the terminal can comprise a terminal 10' capable of transmitting and/or receiving data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12A for receiving content from the DVB-T TX, and another antenna 12B for transmitting signals to and for receiving signals from a BS 14. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 34 via the TX 31, the terminal can be coupled to a digital broadcast (DB) receiving terminal 28 which, in turn, can be coupled to the digital broadcaster 30, such as directly and/or via the TX. In such instances, the digital broadcast receiver can comprise a DVB-T receiver, such as a DVB-T receiver in the form of a set top box. The terminal can be locally coupled to the digital broadcast receiver, such as via a personal area network. In one advantageous embodiment, however, the terminal can additionally or alternatively be indirectly coupled to the digital broadcast receiver via the Internet 22.

Referring now to FIG. 2, a block diagram of an entity capable of operating as a terminal 10, origin server 24, content flow server 25, digital broadcast receiver 28, and/or a digital broadcaster 30 is shown in accordance with one embodiment of the present invention. Although shown as separate entities, in some embodiments, one or more entities may support one or more of a terminal, origin server, digital broadcast receiver, and/or a digital broadcaster, logically separated but co-located within the entit(ies). For example, a single entity may support a logically separate, but co-located, terminal and digital broadcast receiver. Also, for example, a single entity may support a logically separate, but co-located digital broadcast receiver and digital broadcaster.

As shown, the entity capable of operating as a terminal 10, origin server 24, content flow server 25, digital broadcast receiver 28, and/or a digital broadcaster 30 can generally include a processor 32 connected to a memory 34. The processor can also be connected to at least one interface 36 or other means for transmitting and/or receiving data, content or the like. The memory can comprise volatile and/or non-volatile memory, and typically stores content, data or the like. For example, the memory typically stores software applications, instructions or the like for the processor to perform steps associated with operation of the entity in accordance with embodiments of the present invention. Also, for example, the memory typically stores content transmitted from, or received by, the terminal, digital broadcast receiver, and/or digital broadcaster.

Reference is now made to FIG. 3, which illustrates a functional block diagram of a digital broadcast receiver 28, in accordance with one embodiment of the present invention. As shown, the digital broadcast receiver includes an antenna 40 for receiving signals from a digital broadcaster 30 and feeding the signals into a receiver (RX) 42. In turn, the receiver is capable of decrypting, demodulating and/or demultiplexing the signals, such as to extract content data. The receiver can feed the content data to a processor 44, which can thereafter decode the content data. The processor can then feed the decoded signal into an audio/video (A/V) interface 46, which can convert signals to a form suitable for display by a monitor, such as a television set 48.

The digital broadcast receiver 28 can include volatile memory 50, such as volatile Random Access Memory (RAM) including a cache area for the temporary storage of data. The digital broadcast receiver can also include non-volatile memory 52, which can be embedded and/or may be removable. The non-volatile memory can additionally or alternatively comprise an EEPROM, flash memory, hard disk or the like. The memories can store any of a number of pieces of information, content and data, used by the digital broadcast receiver to implement the functions of the digital broadcast receiver. For example, as indicated above, the memories can store content, such as that received from a digital broadcaster 30. As explained below, the memories can also store a content flow manager 53 capable of controlling storage of content by the digital broadcast receiver and/or a terminal 10.

The digital broadcast receiver 28 can also include one or more interface means for sharing and/or obtaining data from electronic devices, such as terminals 10 and/or digital broadcasters 30. More particularly, the digital broadcast receiver can include a network interface means 54, for sharing and/or obtaining data from a network, such as the Internet 22 and/or the DVB-T 31. For example, the digital broadcast receiver can include an Ethernet Personal Computer Memory Card International Association (PCMCIA) card configured to transmit and/or receive data to and from a network, such as the Internet.

The digital broadcast receiver 28 can also include one or more local interface means 56 for locally sharing and/or obtaining data from electronic devices, such as a terminal. For example, the digital broadcast receiver can include a radio frequency transceiver and/or an infrared (IR) transceiver so that data can be shared with and/or obtained in accordance with radio frequency and/or infrared transfer techniques. Additionally, or alternatively, for example, the digital broadcast receiver can include a Bluetooth (BT) transceiver operating using Bluetooth brand wireless technology developed by the Bluetooth Special Interest Group such that the digital broadcast receiver can share and/or obtain data in accordance with Bluetooth transfer techniques. Further, the digital broadcast receiver can additionally or alternatively be capable of sharing and/or obtaining data in accordance with any of a number of different wireline and/or wireless networking techniques, including LAN and/or WLAN techniques.

Reference is now made to FIG. 4, which illustrates a functional block diagram of the digital broadcaster 30 of one embodiment of the present invention. Like the digital broadcast receiver 28, the digital broadcaster can include volatile memory 60, such as volatile Random Access Memory (RAM) including a cache area for the temporary storage of data. The digital broadcaster can also include non-volatile memory 62, which can be embedded and/or may be removable. The non-volatile memory can additionally or alternatively comprise an EEPROM, flash memory or the like. The memories can store any of a number of pieces of information, content and data, used by the digital broadcaster to implement the functions of the digital broadcaster. For example, as indicated above, the memories can store content, such as content for a television channel and other content for a number of other television, radio and/or data channels.

The digital broadcaster 30 can also include a multiplexer 64, which can be capable of multiplexing content for a number of television, radio and/or data channels. The multiplexer can then feed the resulting signal into a TX 31, which can be separate from the digital broadcaster, as shown in FIG. 1, or incorporated within the digital broadcaster, as shown in FIG. 4. Irrespective of where the TX is located relative to the digital broadcaster, the TX can receive the signal from the multiplexer for encryption, modulation, amplification and/or transmission, such as via an antenna 68. In this regard, for example, the digital broadcaster can be capable of directly or indirectly transmitting content to a digital broadcast receiver 28 and/or a terminal 10, such as in accordance with a digital broadcasting technique, such as DVB-T. For information on DVB-T, see European Telecommunications Standards Institute (ETSI) Standard EN 300 744, entitled: *Digital Video Broadcasting (DVB): Framing structure, channel coding and modulation for digital terrestrial television*, v.1.1.2 (1997) and related specifications, the contents of which are hereby incorporated by reference in their entirety.

In accordance with a number of digital broadcasting techniques, such as DVB-T, Internet Protocol (IP) Datacast (IPDC) can be utilized to provide audio, video and/or other content to terminals 10. In this regard, the digital broadcaster 30 can be capable of providing IP datacasting content to the terminal utilizing a digital broadcasting technique. As will be appreciated by those skilled in the art, digital broadcasting techniques such as DVB-T are essentially cellular in nature with a transmission site associated with each of a number of different cells. DVB-T, for example, uses MPEG-2 transport streams, and as such, IP data can be encapsulated into DVB transmission signals sent from the digital broadcaster, or more particularly the TX 31. Data streams including IP datagrams can be supplied from several sources, and can be encapsulated by an IP encapsulator (not shown). The IP encapsulator, in turn, can feed the encapsulated IP data streams into the data broadcasting (e.g., DVB-T) network.

The encapsulated IP data streams can then be transported to one or more transmission sites, where the transmission sites form cells of the data broadcasting network. For example, the encapsulated IP data streams can be transported to one or more transmission sites on an MPEG-2 transport stream for subsequent transmission over the air directly to the terminals, or to a receiver station serving one or more terminals. As will be appreciated, the MPEG-2 transport stream, from production by the IP encapsulator, to reception by the terminals or the receiver station, is typically uni-directional in nature. In this regard, IP packets containing the data can be embedded in multi-protocol encapsulation (MPE) sections that are transported within transport stream packets.

In addition to the IP packets, the MPE sections can also include forward error correction (FEC) information and time slicing information. By including information such as time slicing information, data can be conveyed discontinuously with the receiver (e.g., terminal 10), being capable of saving battery power by switching off when no data is being transmitted to the receiver. In other terms, in accordance with one time slicing technique, instead of using the current default method of continuous digital broadcasting (e.g., DVB-T) transmission, a time division multiplex-type of allocation technique can be employed (see, e.g., DVB-H standard). With such an approach, then, services can be provided in bursts, allowing a receiver to power down when the receiver is not receiving data, and allowing the receiver to power up to receive data packets, as necessary.

FIG. 5 illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 70, a receiver 72, and a controller 74 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). The mobile station can additionally or alternatively be capable of operating in accordance with any of a number of different digital broadcasting techniques, such as the DVB technique (e.g., DVB-T, ETSI Standard EN 300 744). The mobile station can also be capable of operating in accordance with any of a number of different broadcast and/or multicast techniques, such as the MBMS technique (e.g., 3GPP TS 22.146). Further, the mobile station can be capable of operating in accordance with ISDB-T, DAB, ATSC techniques or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 74 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 74A, and may include an internal data modem (DM) 74B. Further, the controller may include the functionally to operate one or more software applications, which may be stored in memory.

The mobile station also comprises a user interface including a conventional earphone or speaker 76, a ringer 78, a microphone 80, a display 82, and a user input interface, all of which are coupled to the controller 74. The user input interface, which allows the mobile station to receive data, can comprise any of a number of devices allowing the mobile station to receive data, such as a keypad 84, a touch display (not shown) or other input device. In embodiments including a keypad, the keypad includes the conventional numeric (0-9) and related keys (#, ), and other keys used for operating the mobile station.

The mobile station can also include one or more means for sharing and/or obtaining data from electronic devices, such as another terminal 10, an origin server 24, an AP 26, a digital broadcast receiver 28, a digital broadcaster 30 or the like, in accordance with any of a number of different wireline and/or wireless techniques. For example, the mobile station can include a radio frequency (RF) transceiver 86 and/or an infrared (IR) transceiver 88 such that the mobile station can share and/or obtain data in accordance with radio frequency and/or infrared techniques. Also, for example, the mobile station can include a Bluetooth (BT) transceiver 90 such that the mobile station can share and/or obtain data in accordance with Bluetooth transfer techniques. Although not shown, the mobile station may additionally or alternatively be capable of transmitting and/or receiving data from electronic devices according to a number of different wireline and/or wireless networking techniques, including LAN and/or WLAN techniques. In this regard, as shown in FIG. 1 with respect to terminal 10', the mobile station may include an additional antenna or the like to transmit and/or receive data from such electronic devices (e.g., digital broadcaster).

The mobile station can further include memory, such as a subscriber identity module (SIM) 92, a removable user identity module (R-UIM) or the like, which typically stores information elements related to a mobile subscriber. In addition to the SIM, the mobile station can include other memory. In this regard, like the digital broadcast receiver 28 and the digital broadcaster 30, the mobile station can include volatile memory 94. Also, again like the digital broadcast receiver and the digital broadcaster, the mobile station can include other non-volatile memory 96, which can be embedded and/or may be removable. The memories can store any of a number of pieces of information, and data, used by the mobile station to implement the functions of the mobile station. For example, the memories can store content, such as that received from an origin server 24 and/or a digital broadcast receiver. Also, for example, the memories can also store user or host applications such as a conventional Web browser for communicating in accordance with the hypertext transfer protocol (HTTP), a file transfer (e.g., FTP) application, a Telnet application, a peer-to-peer access application, or the like.

As explained in the background section, the terminal 10 typically downloads content in accordance with a pull technique, whereby the terminal receives content in response to a request for such content. And although user preferences, capabilities of the terminal and/or previous contents stored or otherwise received by the terminal can have an affect on the flow of content to the terminal, the digital broadband receiver 28 typically has control over content flow policy to the terminal. Current techniques for downloading content from terminals, however, do not provide for such user preferences, capabilities, previous contents and/or use of previous contents. Thus, current techniques for downloading content can suffer from inefficient control of content received and thereafter stored by terminals, as well as inefficient control of content stored by terminals.

To account for user preferences, capabilities of the terminal 10 and/or previous contents stored by the terminal in the flow of content to the terminal, the terminal of embodiments of the present invention is capable of sending a content status to a network entity, such as an origin server 24, content flow server 25, digital broadcast receiver 28 or the like, where the content status includes status information regarding the terminal. In this regard, the status information can reflect user preferences, capabilities of the terminal, previous contents stored by the terminal and/or use of such previous contents. The network entity can then control the flow of content to the terminal, as well as the storage of content in memory of the terminal, based upon the status information.

More particularly, to control the flow of content to the terminal 10, a network entity, such as an origin server 24, content flow server 25, digital broadcast receiver 28 or the like, is capable of operating a content flow manager 53. The content flow manager, in turn, can control the flow of content, or more particularly the downloading and storage of content, as well as the deletion of content, at the terminal based upon status information regarding the terminal, and if so desired, further based upon status information regarding a source of content, such as the digital broadcast receiver, an origin server 24 or the like. For example, the content flow manager can determine whether to offer an advertisement to a terminal based upon information including the use of similar previous content at the terminal (e.g., whether similar advertisements have previously been presented at the terminal). Additionally, or alternatively, the content flow manager can control the flow of content to the terminal based, at least in part, upon status information available from the network entity operating the content flow manager or from another entity, such as the source of content to the terminal. In such instances, the status information can include, for example, available content, metadata of the available content, current time, and network capacity/load information.

As described herein, the content flow manager 53 typically comprises software capable of being stored within memory (e.g., non-volatile memory 52), and operated by a processor (e.g., processor 44), of a network entity, the digital broadcast receiver 28, content flow server 25 or the like. It should be understood, however, that the content flow manager can alternatively comprise firmware or hardware, without departing from the spirit and scope of the present invention. As also described herein, the content flow manager is capable of controlling the flow of content. For example, the content flow manager can be capable of controlling the flow of content from one or more television, radio and/or data channels received from a digital broadcaster 30 in response to a subscription for content from one or more television, radio and/or data channels. Also, for example, the content flow manager can be capable of controlling the flow of content from one or more origin servers 24 in response to one or more requests for such content. In this regard, it should be understood that the content flow manager can be operated by any of a number of network entities to control the flow of content from any one or more of a number of content sources, whether the network entity operating content flow manager comprises, or is separate from, the content source(s).

Reference is now made to FIG. 6, which illustrates various steps in a method of controlling the flow of content in accordance with one embodiment of the present invention. As shown in block 100, a method of controlling storage of content generally includes the terminal 10 downloading or otherwise receiving, at one or more points in time, one or more pieces of content from a content source, such as the origin server 24, the digital broadcast receiver 28 or the like. Upon receipt of the piece(s) of content, then, the terminal can store the content, such as into non-volatile memory (e.g., memory 96). Although not shown, in one typical embodiment, a user of the terminal can subscribe, such as with the digital broadcast receiver, to content from one or more television, radio and/or data channels, such as those capable of being provided by a digital broadcaster 30. In such instances, the content received at, and stored by, the terminal can include piece(s) of subscribed content.

After the terminal 10 has stored at least one piece of content, the terminal 10 can send, and the content flow manager 53 can receive, a content status at one or more points in time (e.g., periodically), as shown in block 102. The content status can request any of a number of different pieces of content. In accordance with embodiments of the present invention, the content status includes terminal status information. As will be appreciated, the content status can be sent and received independent of a desire by the terminal 10 to receive, or the content source to send, content. It should also be appreciated, however, that the content status can be sent within, or otherwise associated with a request for subscribed content and/or updates to such content available from the source, such as the digital broadcast receiver 28.

The status information in the content status can include any of a number of different pieces of information regarding the terminal 10 and the contents stored therein. For example, the status information can include information regarding the remaining storage capacity of the memory of the terminal. In addition, for example, the status information can include information regarding the pieces of content stored in memory, such as a listing of the pieces of content stored in memory, the time that the terminal received or otherwise downloaded each piece of content in memory; the time (if any) that the terminal utilized each piece of content in memory and/or the manner that the terminal utilized each respective piece of content in memory.

Upon receipt, the content flow manager 53 can be provided with the terminal status information. In addition to the terminal status information, the content flow manager can be provided with server status information regarding a source of content to the terminal 10, and possibly the communication channel between the source and the terminal (via e.g., a direct communication channel, the Internet 22, etc.). In this regard, in one embodiment, the source of content to the terminal comprises, or is associated with, the network entity operating the content flow manager. For example, the origin server 24, digital broadcast receiver 28 or the like can comprise the source of content to the terminal and operate the content flow manager 53. Alternatively, for example, the origin server, digital broadcast receiver or the like can comprise the source of content to the terminal and be associated with another network entity, such as the content flow server 25, which operates the content flow manager.

Irrespective of the source of content and network entity operating the content flow manager 53, the server status information can include, for example, the current time, a listing of one or more pieces of content available from (e.g., stored by) the source of content to the terminal 10. Additionally, for example, the server status information can include a type of each piece of content available from the source, where the type can identify, for example, content from one or more television, radio and/or data channels. Further, for example, the server status information can include capacity and/or load information regarding the communication channel between the source and the terminal.

After the content flow manager 53 has been provided with the terminal status information and the server status information, the content flow manager can determine if memory of the terminal 10 includes one or more pieces of content to delete, as shown in block 106. The content flow manager can determine if memory of the terminal includes one or more pieces of content to delete in any of a number of different manners. For example, the content flow manager can compare the time that the terminal received or otherwise downloaded each piece of content in memory (from the terminal status information) with the current time (from the server status information). Based upon the comparison, then, the content flow manager can determine if the difference between the download time and the current time of each piece of content exceeds expiration time period to thereby identify one or more expired pieces of content. The content flow manager can then designate the expired piece(s) of content as the piece(s) of content to delete from memory of the terminal.

In addition to, or in lieu of, determining if memory of the terminal includes piece(s) of content to delete, the content flow manager 53 can determine if the source of content to the terminal 10 has one or more pieces of content available for download by the terminal, as shown in block 108. Like determining piece(s) of content to delete from memory of the terminal, the content flow manager can determine if the source includes available piece(s) of content in any of a number of different manners. For example, as explained above, a user of the terminal can subscribe, such as with the digital broadcast receiver 28, to content from one or more television, radio and/or data channels. In such instances, the content flow manager can identify content in memory of the digital broadcast receiver from the subscribed television, radio and/or data channel(s) based upon a type associated with each piece of content in memory of the digital broadcast receiver (from the server status information). The content flow manager can then compare the piece(s) of content from the subscribed television, radio and/or data channel(s) with the listing of the pieces of content stored in memory of the terminal. Based upon the comparison, the control flow manager can determine those piece(s) of content (if any) available from (e.g., stored by) the digital broadcast receiver that are not already stored in memory of the terminal. The content flow manager can then designate those piece(s) of content as available piece(s) of content for the terminal to download from the digital broadcast receiver.

After determining if memory of the terminal 10 includes one or more pieces of content to delete, and/or if memory of the source of content to the terminal (e.g., origin server 24, digital broadcast receiver 28, etc.) includes one or more pieces of content for the terminal to download, the content flow manager can send a response to the terminal that instructs the terminal to delete one or more pieces of content to delete (if any), and/or to download one or more pieces of content available for download (if any), as shown in block 110. Upon receipt of the response, if the response includes one or more pieces of content to delete, the terminal can delete such piece(s) of content from memory (e.g., non-volatile memory 96), as shown in blocks 112 and 114.

If the response includes one or more pieces of content for the terminal 10 to download, the terminal can download such piece(s) of content from the source of content (e.g., origin server 24, digital broadcast receiver 28, etc.), as shown in blocks 116 and 118. The terminal can download such piece(s) of content in any of a number of different manners. For example, when the source comprises a digital broadcast receiver (e.g., DVB-T receiver), the terminal can download such piece(s) of content from the digital broadcast receiver in accordance with any of a number of different techniques for downloading content from a digital broadcast receiver. Upon downloading the content, as shown in block 120, the terminal can store the content in memory (e.g., non-volatile memory 96), such as for subsequent use by a user of the terminal.

As explained above, the content flow manager 53 can receive a content request including terminal status information, and in response, control the flow of content to the terminal 10. In this regard, the content flow manager can cause the terminal to delete one or more pieces of content from memory of the terminal, and/or to download one or more pieces of content from a source of content. It should be understood, however, that the content flow manager need not cause the terminal to delete or download content in response to a content request. In this regard, in various instances, the content flow manager may determine that memory of the terminal does not include any pieces of content to delete. Likewise, the content flow manager may determine that the digital broadcast receiver does not have any pieces of content available for download by the terminal. In such instances, the content flow manager can send a response to the terminal instructing the terminal to neither delete nor download any pieces of content. Alternatively, the content flow manager can be configured to send a response only in instances in which the content flow manager determines that the memory of the terminal includes at least one piece of content to delete, or the digital broadcast receiver has at least one piece of content available for download. In the absence of a response, then, the terminal can be indirectly instructed to neither delete nor download any pieces of content in response to the content request.

According to one aspect of the present invention, all or a portion of the system of the present invention, such all or portions of the terminal 10, origin server 24, content flow server 25, digital broadcast receiver 28, and/or a digital broadcaster 30, generally operates under control of a computer program product (e.g., content flow manager 53). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 6 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart supports combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to receive, from a terminal located remote from the apparatus, a content status including terminal status information, and configured to receive server status information regarding a source of content, wherein the server status information comprises a listing of at least one piece of content available from the source, wherein the processor is configured to send, to the terminal, a response to the content status that instructs the terminal to perform one or more actions to thereby control the flow of content to the terminal based upon the terminal status information and the server status information, and
wherein the at least one piece of content available from the source, and the content for which the processor is configured to control the flow, comprise multimedia content.

2. An apparatus according to claim 1, wherein the terminal comprises a memory, and wherein the processor is configured to send, to the terminal, a response to the content status that instructs the terminal to at least one of delete at least one piece of content from the memory of the terminal, or download at least one piece of content from the source.

3. An apparatus according to claim 2, wherein the terminal status information comprises a listing of at least one piece of content stored in the memory of the terminal, and wherein the processor is configured to send, to the terminal, a response to the content status that instructs the terminal to delete at least one piece of content from the memory of the terminal based upon the listing of at least one piece of content stored in the memory of the terminal.

4. An apparatus according to claim 2, wherein the server status information comprises a listing of at least one piece of available content from the source, and wherein the processor is configured to send, to the terminal, a response to the content status that instructs the terminal to download at least one piece of content from the source based upon the listing of at least one available piece of content from the source.

5. An apparatus according to claim 2, wherein the processor is configured to determine if the memory of the terminal includes at least one piece of content to delete, and wherein the processor is configured to send, to the terminal, a response to the content status that instructs the terminal to delete at least one piece of content when the processor determines that the memory of the terminal includes at least one piece of content to delete.

6. An apparatus according to claim 5, wherein the processor is further configured to determine if source includes at least one available piece of content for the terminal to download, and wherein the processor is configured to send, to the terminal, a response to the content status that instructs the terminal to download at least one available piece of content when the processor determines that the source includes at least one available piece of content for the terminal to download.

7. An apparatus comprising:
a controller operable with a terminal including a memory configured to store at least one piece of content, wherein the controller is configured to send a content status including terminal status information comprising a listing of at least one piece of content stored in the memory, wherein the controller is configured to send the content status to a remote network entity, and receive a response to the content status from the network entity that instructs the controller to perform one or more actions to thereby control a flow of content to the terminal based upon the terminal status information, and
wherein the at least one piece of content stored in the memory, and the content for which the network entity is configured to control the flow, comprise multimedia content.

8. An apparatus according to claim 7, wherein the controller is configured to receive a response that instructs the controller to at least one of delete at least one piece of content from the memory of the terminal, or download at least one piece of content from a source of content.

9. An apparatus according to claim 8, and wherein the controller is configured to receive a response that instructs the controller to delete at least one piece of content from the memory of the terminal based upon the listing of at least one piece of content stored in the memory of the terminal.

10. An apparatus according to claim 8, wherein the controller is configured to receive a response that instructs the controller to download at least one piece of content from the source based upon server status information comprising a listing of at least one available piece of content from the source.

11. An apparatus according to claim 8, wherein the controller is configured to send the content status such that the network entity determines if the memory of the terminal includes at least one piece of content to delete, and wherein the controller is configured to receive a response that instructs the controller to delete at least one piece of content when the network entity determines that the memory of the terminal includes at least one piece of content to delete.

12. An apparatus according to claim 11, wherein the controller is configured to send the content status such that the network entity further determines if the source includes at least one available piece of content for the terminal to download, wherein the controller is configured to receive a response that further indicates if the source includes at least one available piece of content, and wherein the controller is further configured to download the at least one available piece of content when the network entity determines that the source includes at least one available piece of content.

13. A method for controlling a flow of content, the method comprising:
receiving, at a network entity from a terminal located remote therefrom, a content status including terminal status information comprising a listing of at least one piece of content stored in a memory of the terminal; and
sending, from the network entity to the terminal, a response to the content status that instructs the terminal to perform one or more actions to thereby control the flow of content to the terminal based upon the terminal status information,
wherein the at least one piece of content stored in the memory of the terminal, and the content for which the flow is controlled, comprise multimedia content.

14. A method according to claim 13, wherein sending a response comprises sending a response that instructs the terminal to at least one of delete at least one piece of content from the memory of the terminal, or download at least one piece of content from a source of content.

15. A method according to claim 14, and wherein sending a response comprises sending a response that instructs the terminal to delete at least one piece of content from the memory of the terminal based upon the listing of at least one piece of content stored in the memory of the terminal.

16. A method according to claim 14, wherein sending a response comprises sending a response that instructs the terminal to download at least one piece of content from the source based upon server status information comprising a listing of at least one available piece of content from the source.

17. A method according to claim 14 further comprising:
determining if the memory of the terminal includes at least one piece of content to delete,
wherein sending a response comprises sending a response that instructs the terminal to delete at least one piece of content when the memory of the terminal is determined to include at least one piece of content to delete.

18. A method according to claim 17 further comprising:
determining if the source includes at least one available piece of content for the terminal to download,
wherein sending a response comprises sending a response that further instructs the terminal to download at least one available piece of content when the source is determined to include at least one available piece of content.

19. A computer-readable storage medium having computer-readable program code portions stored therein, the computer-readable program code portions comprising:
a first executable portion configured to receive, at a network entity from a terminal located remote therefrom, a content status including terminal status information comprising a listing of at least one piece of content stored in a memory of the terminal; and
a second executable portion configured to send, from the network entity to the terminal, a response to the content status that instructs the terminal to perform one or more actions to thereby control the flow of content to the terminal based upon the terminal status information, wherein the at least one piece of content stored in the memory of the terminal, and the content for which the flow is controlled, comprise multimedia content.

20. A computer-readable storage medium according to claim 19, wherein the second executable portion is configured to send a response that instructs the terminal to at least one of delete at least one piece of content from the memory of the terminal, or download at least one piece of content from a source of content.

21. A computer-readable storage medium according to claim 20, wherein the second executable portion is configured to send a response that instructs the terminal to delete at least one piece of content from the memory of the terminal based upon the listing of at least one piece of content stored in the memory of the terminal.

22. A computer-readable storage medium according to claim 20, wherein the second executable portion is configured to send a response that instructs the terminal to download at least one piece of content from the source based upon server status information comprising a listing of at least one available piece of content from the source.

23. A computer-readable storage medium according to claim 20 further comprising:
a third executable portion configured to determine if the memory of the terminal includes at least one piece of content to delete,
wherein the second executable portion is configured send a response that instructs the terminal to delete at least one piece of content when the second executable portion determines the memory of the terminal includes at least one piece of content to delete.

24. A computer-readable storage medium according to claim 23, wherein the third executable portion is further configured to determine if the source includes at least one available piece of content for the terminal to download, and wherein the second executable portion is configured to send a response that further instructs the terminal to download at least one available piece of content when the second executable portion determines the source includes at least one available piece of content.

* * * * *